United States Patent [19]

Shelton et al.

[11] Patent Number: 5,339,846

[45] Date of Patent: Aug. 23, 1994

[54] LINE MOLE TRAP

[75] Inventors: Robert Q. Shelton, Duncan; James V. Pratt, Jr., Pauls Valley, both of Okla.

[73] Assignee: Halliburton Company, Duncan, Okla.

[21] Appl. No.: 968,727

[22] Filed: Oct. 30, 1992

[51] Int. Cl.⁵ .................... B08B 9/02; F16L 39/04
[52] U.S. Cl. .................. 134/201; 134/167 C; 285/320
[58] Field of Search ............ 285/34, 35, 320, 420; 134/167 C, 168 C, 201; 15/104.33

[56] References Cited

U.S. PATENT DOCUMENTS

| | | | |
|---|---|---|---|
| 1,916,284 | 7/1933 | Ragan | 285/35 |
| 2,327,714 | 8/1943 | Iftiger, Sr. | 285/35 |
| 2,770,474 | 11/1956 | Krapp | 285/320 X |
| 3,339,947 | 9/1967 | Maisey | 285/320 X |
| 4,202,567 | 5/1980 | Paddington | 285/320 X |
| 4,643,218 | 2/1987 | Reed, Jr. | 134/167 C X |

FOREIGN PATENT DOCUMENTS

| | | | |
|---|---|---|---|
| 248808 | 8/1966 | Austria | 285/320 |
| 2449274 | 5/1975 | Fed. Rep. of Germany | 285/320 |

*Primary Examiner*—Philip R. Coe
*Attorney, Agent, or Firm*—Arnold, White & Durkee

[57] ABSTRACT

A line mole trap used as a safety device in water blasting operations is attachable to the end of a pipe and has a tubular sleeve partially disposed within a housing assembly. A line mole connected to a fluid supply hose and inserted through the sleeve is prevented from exiting the rear of the trap by a yoke placed around the supply hose. In response to the relative movement of the sleeve and housing caused by the action of a compressed spring and air cylinder, a plurality of jaws, each operatively coupled to a linkage coupling the housing and sleeve, either collapse against or retract away from the surface of the pipe being cleaned.

10 Claims, 3 Drawing Sheets

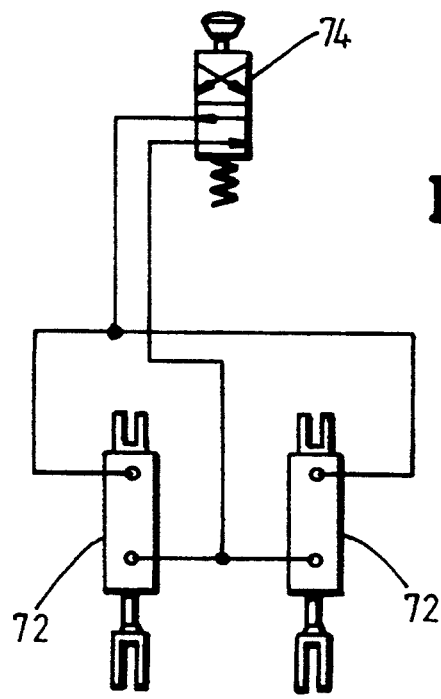
Fig. 5
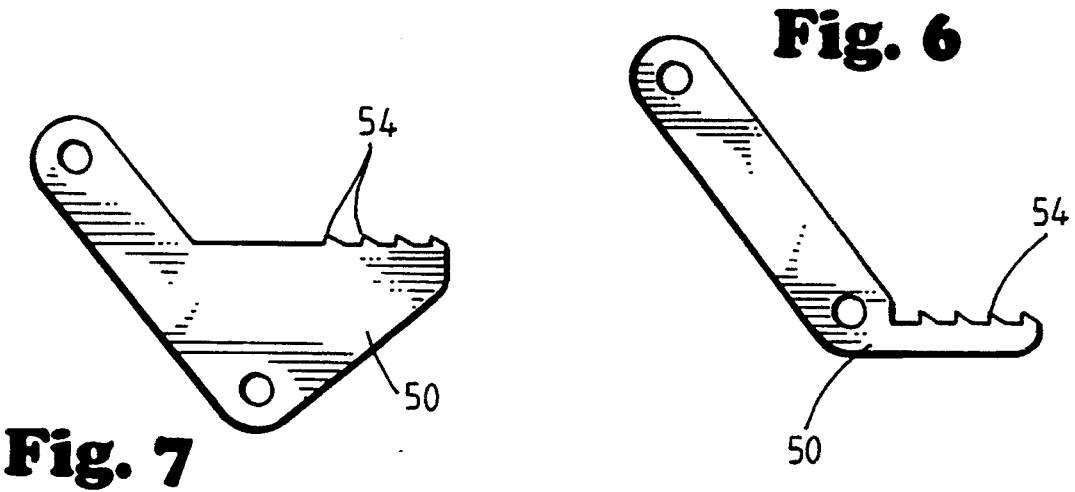
Fig. 7  Fig. 6
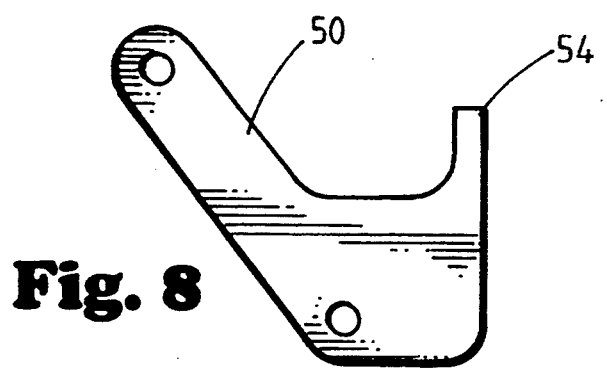
Fig. 8

LINE MOLE TRAP

BACKGROUND OF THE INVENTION

The invention relates to an improved line mole trap used in the cleaning of tubular targets by water-blasting techniques. Tubular targets generally include tubular members such as pipes, square tubes, cylindrically-shaped containers, conduit, and other hollow members and chambers having at least one opening. However, the invention is particularly concerned with a device attachable to various-sized pipes that can protect an operator from the hazardous conditions associated with the emergence of a line mole from the entrance of a pipe.

One of the most hazardous conditions encountered in water-blasting results from the use of hydraulic line mole. A hydraulic line mole consists of a body containing several orifices attached to the end of a high pressure flexible hose. The attached line mole is inserted into a tubular target and directs high pressure streams of liquid against the interior surfaces of the target to scour these surfaces clean. Some of the orifices in the line mole body are directed rearward. These rear-facing orifices provide a thrust to the line mole, causing it to move forward, pulling the flexible supply hose behind it. Line mole forward speed is regulated by restraint applied to the flexible hose. The tubular target is cleaned by allowing the line mole to advance.

Quite often during the cleaning of the tubular target the line mole is retracted by applying a pull to the supply hose to overcome the thrust of the rearward facing jets. When the line mole is retracted by an operator standing near the entrance of the tubular target, a slight misjudgment might result in the line mole being withdrawn completely from the tubular target. Under such circumstances the operator is exposed to the line mole's high pressure liquid jets, and injury or death may result. Under certain other conditions, the tubular target may become plugged during cleaning. When plugging occurs the volume of water inside the tubular target ahead of the line mole increases, forcing the line mole to move backward. This displacement results in similar hazardous exposure to the operator.

To protect the operator from the high pressure jet streams the line mole must be encapsulated in a protective device as it emerges from the tubular target to dissipate the energy of the high pressure fluid streams before it endangers the operator. Several schemes have been tried. Devices have been built to prevent the exit of the line mole from the tubular target, but those devices have several drawbacks. First, they usually fit only one size tubular target. Secondly, those devices do not allow the tubular target to be cleaned all the way to the end. Finally, they are very slow and cumbersome to install, thereby tempting the operator to forego their use. The line mole trap of the present invention overcomes these deficiencies.

SUMMARY OF THE INVENTION

An exemplary line mole trap in accordance with the present invention includes a generally cylindrically shaped member adapted for catching or trapping the line mole as it exits the tubular target. This catching cylinder does not stop the flow of water, but interrupts the high velocity streams and dissipates their energy. In this preferred embodiment, the line mole trap includes a yoke at the rear of the trap which allows the high pressure flexible hose to pass, but does not permit the larger line mole body to exit. This exemplary line mole trap can attach to plain ended pipe through use of spring and air actuated slip resistant jaws. In one exemplary construction, a single line mole trap can grip either the internal or external surfaces of pipes which range in diameter from about 4.0 to about 12.0 inches.

A line mole cleaning operation utilizing the preferred embodiment of the line mole trap is performed generally as follows. An operator inserts the line mole body and supply hose through a central opening in a threaded cap and through a sleeve and housing. A properly sized yoke is then placed over or around the hose and affixed in place by screwing the cap onto the housing. At this point the hose and line mole assembly can be advanced forward, but the line mole cannot be withdrawn rearward from the protective sleeve and housing. The operator then positions the slip resistant jaws so that in their retracted position they can enter the tubular target, and in their extended position the jaws obtain a good grip on the interior of the pipe. In this preferred implementation, an air supply is then connected to a 2-position 4-way spring return valve. This valve, when actuated, supplies a force to two small air cylinders which compress a mechanical spring and retract the slip resistant jaws so they can be inserted into the pipe. When the spring return valve is released, air is directed to the other side of the small air power cylinders, causing the slip resistant jaws to engage the interior of the pipe. If the air supply is interrupted at any time during the cleaning operation, the force from the mechanical spring will maintain engagement of the jaws and the tubular target.

Once the line mole trap is in place on the end of a tubular target, the high pressure pump can be started and the line mole allowed to advance. To enhance the cleaning operation the line mole can be withdrawn. If withdrawn to the maximum position, the line mole will be trapped inside the sleeve and housing. The operator thus will be protected from exposure to the high velocity fluid jets. In addition, if the line mole is retracted forcefully and bumped against the restraining yoke, the leverage arrangement of the slip resistant jaws will create an increased engagement force which resists disengagement of the line mole trap from the tubular target.

Once the tubular target is clean, the high pressure fluid pump can be shut down, the jaws retracted, and the line mole trap, with its retained line mole, moved to the next tubular target. This process can be repeated easily, making the line mole trap of the present invention particularly useful for cleaning pipe on a rack.

Examples of the more important features of this invention have been broadly outlined in order that the detailed description that follows may be better understood and so that the contributions which this invention provides to the art may be better appreciated. There are, of course, additional features of the invention which will be described herein and which will be included within the subject matter of the claims appended hereto.

BRIEF DESCRIPTION OF THE DRAWINGS

In the drawings:

FIG. 5 is schematic diagram of the 2-position 4-way spring return valve and air cylinders of the line mole trap of FIG. 1.

FIG. 6 is a view of a jaw shown in FIG. 1.

FIG. 7 is a view of an alternative jaw for the line mole trap of FIG. 1.

FIG. 8 is a view of a jaw adapted to grip the end of a victaulic pipe.

DETAILED DESCRIPTION OF THE INVENTION

Additional objects, features and advantages of the present invention will become apparent by referring to the following detailed description of the invention in connection with the accompanying drawings.

As noted earlier, the present invention is a safety device used in water blasting techniques to protect an operator from harmful jets of fluid. To protect an operator when a line mole is withdrawn from a tubular target such as a pipe, the line mole preferably is contained upon its exit within a device adapted to shield the operator and dissipate the energy of the fluid jets. The basic containment means of the present invention is an tubular body or sleeve disposed and slidable within a tubular housing. These two elements together form walls of a chamber which, when properly positioned at the entrance to a tubular target such as a pipe, traps an exiting line mole and shields an operator from the line mole's harmful fluid jets.

Figure 1:
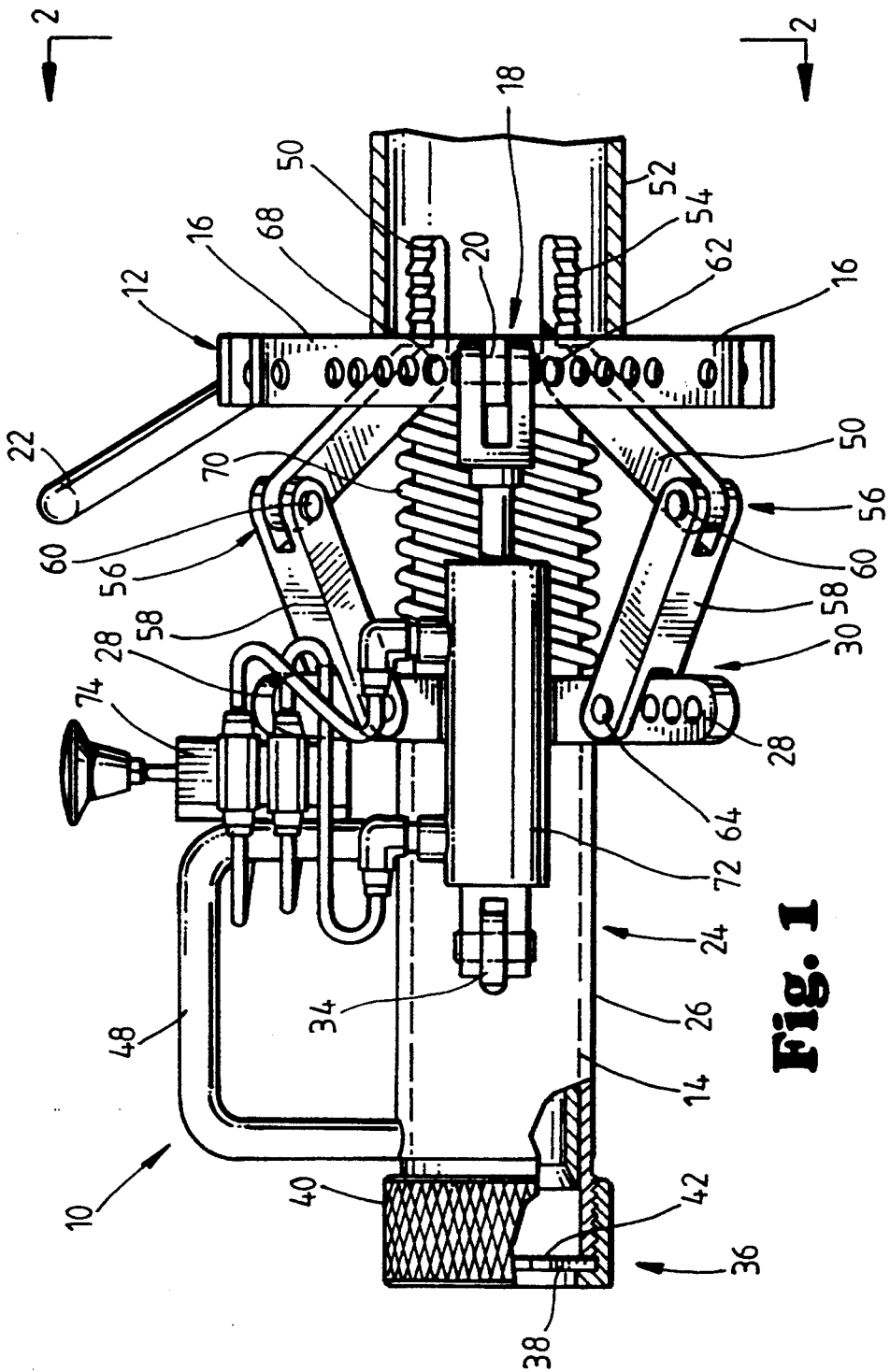
FIG. 1 is a side view of the line mole trap with jaws adapted to collapse against and grasp the interior surface of a pipe, illustrated partially in vertical section.
Figure 2:
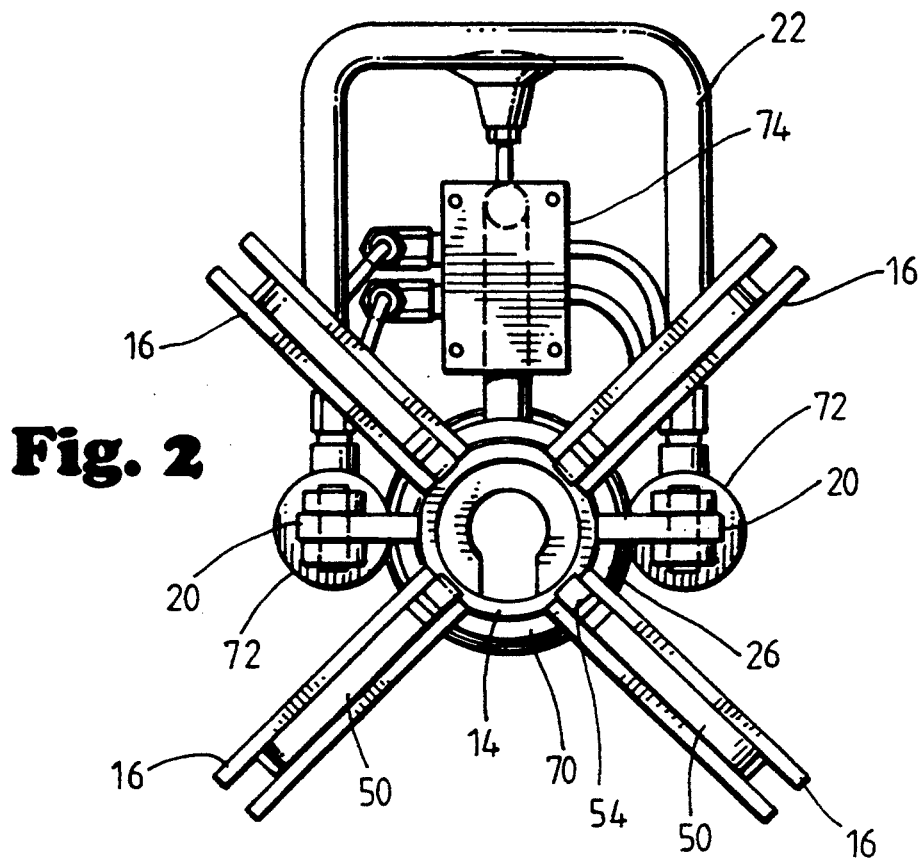
FIG. 2 is an end view of the line mole trap illustrated along line 2—2 in FIG. 1.

Referring now to the drawings in more detail, and particularly to FIGS. 1 and 2, therein is depicted an exemplary line mole trap 10 in accordance with the present invention. As shown in FIGS. 1 and 2, sleeve 12 is comprised of a tubular member 14 having a plurality of jaws linkage connection members 16 extending radially outward from its front end 18. The jaws linkage connection members 16 are rigidly attached to tubular member 14 and preferably spaced equally apart from one another. Also extending outward from the sleeve's tubular member is at least one air cylinder connector. In the preferred embodiment two connectors 20 are rigidly attached to tubular member 24 and diametrically opposed to one another. A forward handle also may be positioned on the top of the sleeve. Preferably handle 22 is rigidly coupled to the top-most jaws linkage connection members 16.

Sleeve 12 is positioned so that a portion of tubular member 14 is slidably disposed within housing assembly 24. The sleeve 12 and housing 24 are movable relative to each other and have a telescoping relationship. The housing 24 is comprised of a tubular member 26 having a plurality of jaws linkage connection members 28 extending radially outward from its front end 30. Jaws linkage connection members 28 are rigidly attached to tubular member 26, preferably spaced equally apart from one another. Also extending outward from the housing assembly is at least one air cylinder connector. In the preferred embodiment two air cylinder connectors 34 are rigidly attached to tubular member 26 and diametrically opposed to one another.

Figure 3:
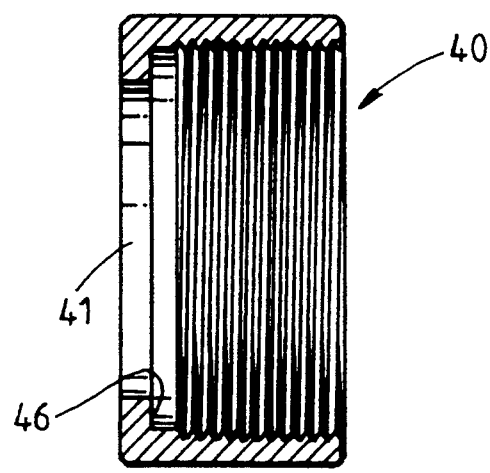
FIG. 3 is a side view of the cap shown in FIG. 1.
Figure 4:
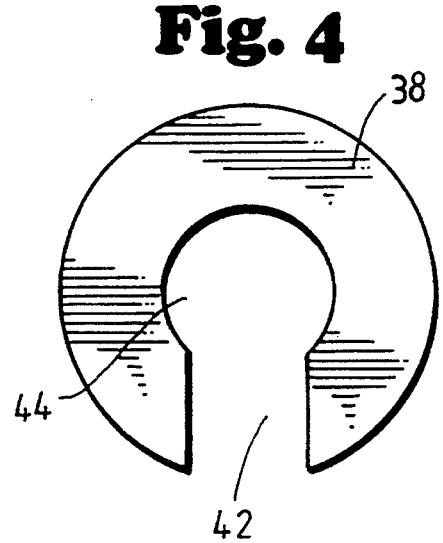
FIG. 4 is a view of the retainer shown in FIG. 1.

The rear end 36 of the line mole trap 10 contains or engages a yoke designed to prevent the line mole from being completely withdrawn from the housing assembly 24 and sleeve 12. In the preferred embodiment the yoke consists of two washer-like retainers 38 which are placed over the line mole flexible supply hose and held against the rear end of housing 24 by cap 40. The cap 40 and retainer 38 are shown in FIGS. 3 and 4, respectively. Cap 40 has a central opening 41. The retainers 38 preferably are positioned so that the slots 42 in retainers 38 are not aligned. When in place, retainers 38 allow the flexible supply hose to be fed or withdrawn through the line mole trap 10, but do not permit the line mole to exit the rear end 36 of the line mole trap 10. The center holes 44 of retainers 38 have diameters which are slightly larger than the outside diameter of the line mole fluid supply hose but are not large enough to permit the line mole to pass. The outside diameter of retainers 3e is large enough so that the retaining shoulder 46 of cap 40 will hold the retainers 38 against the rear end of housing 24. Preferably both cap 40 and the rear end of housing 24 are threaded, with the retainers 38 being held in place when the cap 40 and housing 24 are screwed together snugly. The retainers 38 thus preferably form the back of the line mole retention chamber and help keep the operator from being exposed to the line mole's potentially harmful fluid jets.

For convenience and ease of operation a rear handle also may be positioned on the housing. FIG. 1 shows a rear handle 48 on top of housing 24. Of course the size, shape and location of the handle may vary. Likewise, the line mole trap of the present invention could be constructed by using any of a wide variety of available materials. Generally, however, lightweight materials such as aluminum are preferred as use of such materials means the line mole trap will generally be lightweight and easy to use.

The line mole trap of the present invention adapted to grasp and hold the internal surface of a pipe is shown in FIG. 1. A plurality of jaws 50 are positioned to grasp the interior surface of pipe 52. Grasping results when outward-facing teeth 54 located along a portion of the front end of each jaw 50 collapse against the interior surface of pipe 52. The shape of the teeth 54 may vary depending on the application for which the line mole trap is used.

During the line mole cleaning operation the front end of the sleeve will bear upon the tubular target or pipe. Preferably, however, the end of the grasped pipe abuts the forward edges of the jaws linkage connection members 16 of the sleeve 12 for increased stability during operation. Of course one of ordinary skill in the art will recognize that the front end of the sleeve 12 may be adapted in various ways, such as including a plate or other bearing member, to abut the pipe and provide enhanced operating characteristics such as increased stability.

Each jaw 50 is a part of a jaws linkage 56. Preferably each jaws linkage 56 is comprised of a jaw 50 and an actuator link 58. The rear end of jaw 50 and the front end of actuator link 58 are connected with a pin so that both are free to rotate or pivot about jaws linkage connection point 60. Each jaw 50 is also similarly pin connected at a more forward connection point 62 to a jaws linkage connection member 16 of sleeve 12. This more forward jaws linkage connection point 62 preferably has a fixed location relative to the jaws linkage connection member 16 during the actual cleaning stage of the line mole cleaning operation. The rear end of each actuator link 58 is pin connected at connection point 64 to a jaws linkage connection member 28 of housing 24. Actuator link 58 is free to rotate about connection point 64, and preferably connection point 64 is fixed relative to the jaws linkage connection member 28 during the actual cleaning stage of the line mole cleaning operation.

Whenever there is a displacement of either a housing or sleeve jaws linkage connection member relative to the other, the jaws linkage 56 creates a camming or leveraging action causing its respective jaw 50 to either collapse against or retract from the surface of pipe 52. For example, when the jaws 50 and jaws linkages 56 are positioned as in FIG. 1, moving jaws linkage connection member 16 of sleeve 12 forward or away from jaws linkage connection member 28 of housing 24 causes the jaws 50 to collapse against the inside wall of pipe 52. Conversely, moving jaws linkage connection member 16 of sleeve 12 rearward or toward jaws linkage connection member 28 of housing 24 causes the jaws 50 to retract away from the inside wall of the pipe 52. Or to put it a different way, when connection point 60 moves inward or toward sleeve 12, jaws 50 will collapse against the pipe surface, and when connection point 60 moves outward or away from sleeve 12, jaws 50 will retract away from the pipe surface.

The line mole trap of the present invention preferably is adjustable to fit a wide variety of pipe sizes. The line mole trap can be adjusted by using various-shaped jaws. Two examples are shown in FIGS. 6 and 7. The line mole trap also can be adjusted to fit a variety of pipe sizes by varying or moving along the length of the jaws linkage connection members 16 and 28 the location of the jaws linkage connection points 64 and 68.

The line mole trap of the present invention is also adjustable for attachment to the outside surface of a pipe or other tubular target. For example, to attach the line mole trap to the outside of a pipe the jaws linkage 56 can be adjusted and jaws 50 reversed so that teeth 54 face inward and clamp onto the outside surface of a pipe when there is relative movement of the housing and sleeve jaws linkage connection members toward each other. Also, jaws can be designed to specifically fit the outsides of particular types of pipe. FIG. 8, for instance, shows a jaw 50 designed to grip the external groove of a victaulic pipe by clamping in the external victaulic groove.

The portion of sleeve 12 which is between the sleeve and housing jaws linkage connection members 16 and 28 of the sleeve 12 and housing 24, respectively, is fitted with a spring 70 which is under compression. The spring 70 acts upon both the housing 24 and sleeve 12 and tends to separate the two. Thus, because of the camming or leveraging action created by the arrangement and positioning of the jaws linkage 56, the spring 70 tends to force the jaws 50 against the pipe and helps hold the line mole trap in place.

Retracting jaws 50 from the surface of pipe 52 involves further compressing spring 70. In the preferred embodiment, retraction is accomplished through the use of two air cylinders 72 attached between air cylinder connectors 20 and 34 located on the sleeve 12 and housing 24. The cylinders 72 are connected to a 2-position 4-way spring return valve 74 hooked to an external air supply hose. When actuated the valve 74 supplies a force to the cylinders 72 which can compress the spring 70, thus retracting jaws 50. The air cylinders 72 also can assist spring 70 in holding the jaws in place against the pipe by tending to push the housing and sleeve jaws linkage connection members apart. However, should the air supply to the cylinders 72 be interrupted, the spring 70 preferably exerts sufficient force to keep the line mole trap in place.

Although a typical embodiment of the present invention has been illustrated and discussed herein, numerous modifications and alternative embodiments of the apparatus of this invention will be apparent to those skilled in the art in view of this description. Accordingly, this description is to be construed as illustrative only and is provided for the purpose of teaching those skilled in the art the manner of constructing the apparatus of the invention. It is to be understood that the forms of the invention shown and described herein are to be considered as the presently preferred embodiments. Various changes may be made in the configurations, sizes, and arrangements of the parts of the invention, as will be recognized by those skilled in the art, without departing from the scope of the invention. For example, equivalent elements might be substituted for those illustrated and described herein, parts or connections might be reversed or otherwise interchanged, and certain features of the invention might be utilized independently of the uses of other features, all as will be apparent to one skilled in the art after receiving the benefit attained through reading the foregoing description of the invention.

What is claimed is:

1. A line mole trap for use in the cleaning of a tubular target by water blasting techniques comprising: a tubular housing having forward and rear ends; a tubular sleeve at least partially disposed within and movable relative to the housing, having forward and rear ends, the forward end of the sleeve adapted to bear against the end of the tubular target; and a plurality of linkages coupling the housing and sleeve to permit the telescopic movement of the housing and sleeve relative to each other, each linkage containing a gripping member adapted to engage a surface of the tubular target in response to the relative movement of the housing and sleeve.

2. The apparatus of claim 1 wherein a spring urges relative movement between the housing and sleeve.

3. The apparatus of claim 1 wherein an air cylinder urges relative movement between the housing and sleeve.

4. The apparatus of claim 1 wherein the gripping member is a jaw coupled to the forward end of the sleeve.

5. The apparatus of claim 1 further comprising a cap having a central opening and a shoulder adapted to hold a retainer against the rear end of the housing.

6. A line mole trap for use in the cleaning of a generally tubular target comprising: a housing assembly having forward and rear ends; a sleeve assembly at least partially disposed within said housing assembly in a telescoping relationship, said sleeve assembly having a forward end projecting beyond the forward end of said housing assembly, said forward end of said sleeve assembly adapted to bear against an end of said tubular target; a plurality of articulated linkages, each linkage having a first and second end, the first end of each said linkage pivotally coupled to said housing assembly, and the second end of each linkage pivotally coupled to said forward end of said sleeve assembly, said plurality of linkages operable to engage a surface of the tubular target in response to relative movement between the forward end of the housing assembly and the forward end of the sleeve assembly; and a plurality of jaws configured to selectively engage said tubular target, at least one of said jaws operatively coupled to an individual linkage of said plurality of articulated linkages, said jaws arranged for radial movement in response to telescoping movement between said sleeve assembly and said housing assembly.

7. The apparatus of claim 6 wherein each jaw of said plurality of jaws is pivotally connected to said target engaging member, and wherein each said jaw has a forward end which pivots between first and second radial positions, said jaw forward end engaging the surface of the tubular target only when in the second radial position, and wherein each linkage of said plurality of articulated linkages has one end pivotally connected to said housing assembly and another end pivotally connected to one of said jaws.

8. The apparatus of claim 6, further comprising a spring interposed between said housing assembly and said target engaging member and normally biased to force relative movement between said target engaging member and said housing assembly.

9. The apparatus of claim 6 further comprising a cap having a central opening and a shoulder adapted to hold at least one retainer against the rear end of said housing assembly.

10. The apparatus of claim 6 further comprising an air cylinder for moving said housing assembly and target engaging member back and forth relative to each other.

* * * * *

UNITED STATES PATENT AND TRADEMARK OFFICE
CERTIFICATE OF CORRECTION

PATENT NO. : 5,339,846
DATED : August 23, 1994
INVENTOR(S) : Robert Q. Shelton and James V. Pratt, Jr.

It is certified that error appears in the above-identified patent and that said Letters Patent is hereby corrected as shown below:

Column 3, line 46, please delete "24" and replace with --14--.
Column 4, line 14, please delete "3e" and replace with --38--.

Signed and Sealed this

Twenty-second Day of November, 1994

Attest:

BRUCE LEHMAN

*Attesting Officer*      *Commissioner of Patents and Trademarks*